(12) United States Patent
Bollich

(10) Patent No.: US 7,048,069 B1
(45) Date of Patent: May 23, 2006

(54) AGRICULTURAL DISC HARROW AND METHOD

(76) Inventor: Gerald Bollich, 1360 Drew Ave., Eunice, LA (US) 70535

( * ) Notice: Subject to any disclaimer, the term of this patent is extended or adjusted under 35 U.S.C. 154(b) by 149 days.

(21) Appl. No.: 10/763,472

(22) Filed: Jan. 22, 2004

(51) Int. Cl.
*A01B 49/02* (2006.01)

(52) U.S. Cl. .................. 172/187; 172/139; 172/199; 172/178; 172/200; 172/582; 172/147; 172/604

(58) Field of Classification Search .............. 172/139, 172/187, 199, 146, 178, 200, 581, 582, 584, 172/585, 587, 600, 603
See application file for complete search history.

(56) References Cited

U.S. PATENT DOCUMENTS

| | | | |
|---|---|---|---|
| 802,068 A | 11/1905 | Case | |
| 876,145 A | 1/1908 | Buchet et al. | |
| 1,014,987 A | 1/1912 | Weiler | |
| 1,397,333 A * | 11/1921 | Schmitt | 172/187 |
| 1,397,841 A * | 11/1921 | Mays | 172/185 |
| 1,458,246 A * | 6/1923 | Schermuly | 172/482 |
| 1,631,639 A * | 6/1927 | McDonald | 37/366 |
| 1,740,874 A * | 12/1929 | Polhemus et al. | 172/582 |
| 1,822,711 A * | 9/1931 | Silver | 172/394 |
| 1,888,128 A * | 11/1932 | Hester | 172/574 |
| 2,659,291 A | 11/1953 | Tanke | |
| 3,088,527 A * | 5/1963 | Burch | 172/579 |
| 3,106,255 A | 10/1963 | Kenney | |
| 3,225,839 A * | 12/1965 | Petitt | 172/398 |
| 3,334,916 A | 8/1967 | Tibbals | |
| 3,675,725 A | 7/1972 | Schultz | |
| 3,845,825 A | 11/1974 | Boone et al. | |
| 3,931,858 A | 1/1976 | North | |
| 4,002,413 A * | 1/1977 | Foster | 403/234 |
| 4,113,028 A | 9/1978 | Gluck | |
| 4,180,135 A | 12/1979 | Birkenbach et al. | |
| 4,211,284 A * | 7/1980 | Collado | 172/151 |
| 4,308,919 A * | 1/1982 | Coughran, Jr. | 172/240 |
| 4,361,191 A * | 11/1982 | Landoll et al. | 172/146 |
| 4,595,064 A * | 6/1986 | Anderson | 172/178 |
| 4,607,705 A | 8/1986 | Tebben | |
| 4,687,065 A | 8/1987 | Cope et al. | |
| 4,723,787 A | 2/1988 | Hadley et al. | |
| 5,080,178 A | 1/1992 | Dietrich, Sr. | |
| 5,082,064 A | 1/1992 | Landoll et al. | |
| 5,161,622 A | 11/1992 | Godbersen | |
| 5,259,460 A | 11/1993 | Evers | |
| 5,462,123 A | 10/1995 | Harlan et al. | |
| 5,628,373 A * | 5/1997 | Domries | 172/574 |
| 5,881,820 A | 3/1999 | Baker | |
| 5,915,481 A | 6/1999 | Flenker et al. | |
| 6,612,381 B1 | 9/2003 | Powell et al. | |

* cited by examiner

*Primary Examiner*—Victor Batson
(74) *Attorney, Agent, or Firm*—Robert N. Montgomery

(57) ABSTRACT

An agricultural implement consisting primarily of a towed frame supported on retractable wheels, the frame having a plurality of independently adjustable spindles for setting height and angle of attack for various size rotatable discs. Each disc is staggered to reduce resistance and clogging. Each group of discs further includes descending diameter discs at each end with the angle of attack increasing with each decrease in diameter while spacing between the discs decreases as the diameters are reduced. The implement further including harrow teeth or picks located at strategic points adjacent the discs to ensure uniform soil disruption, the disc assembly being convertible from single gang to double gang assembly and may include conventional harrow teeth sets and or unique soil leveler attachments.

20 Claims, 11 Drawing Sheets

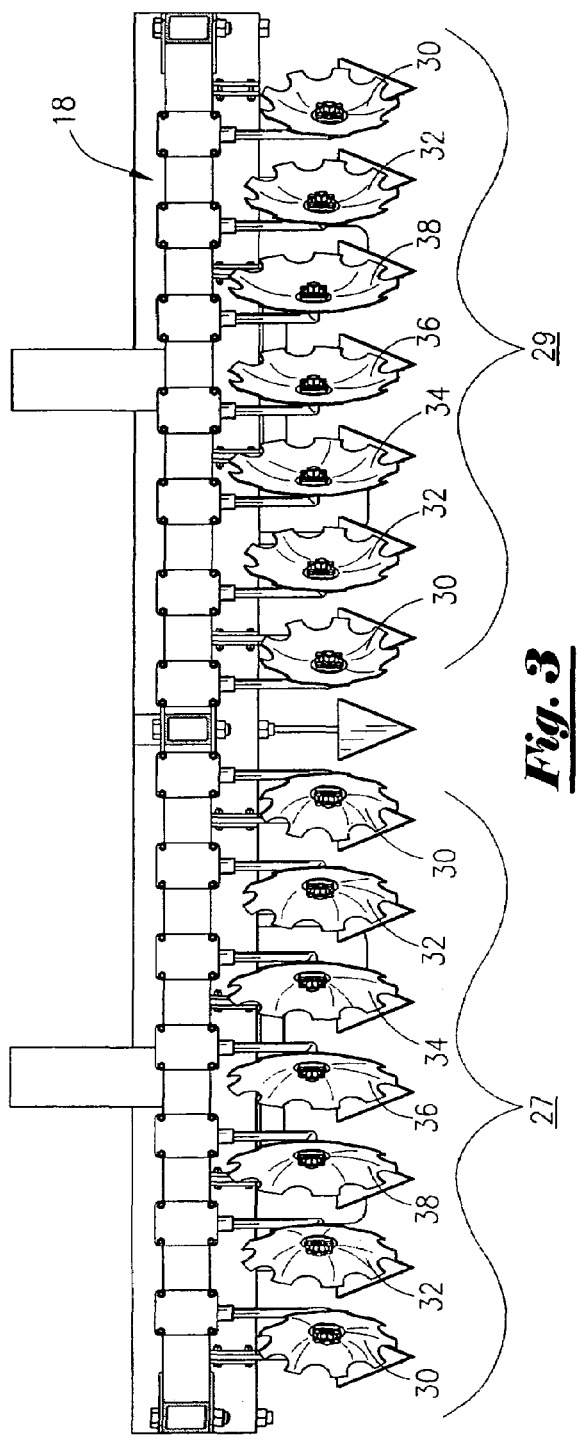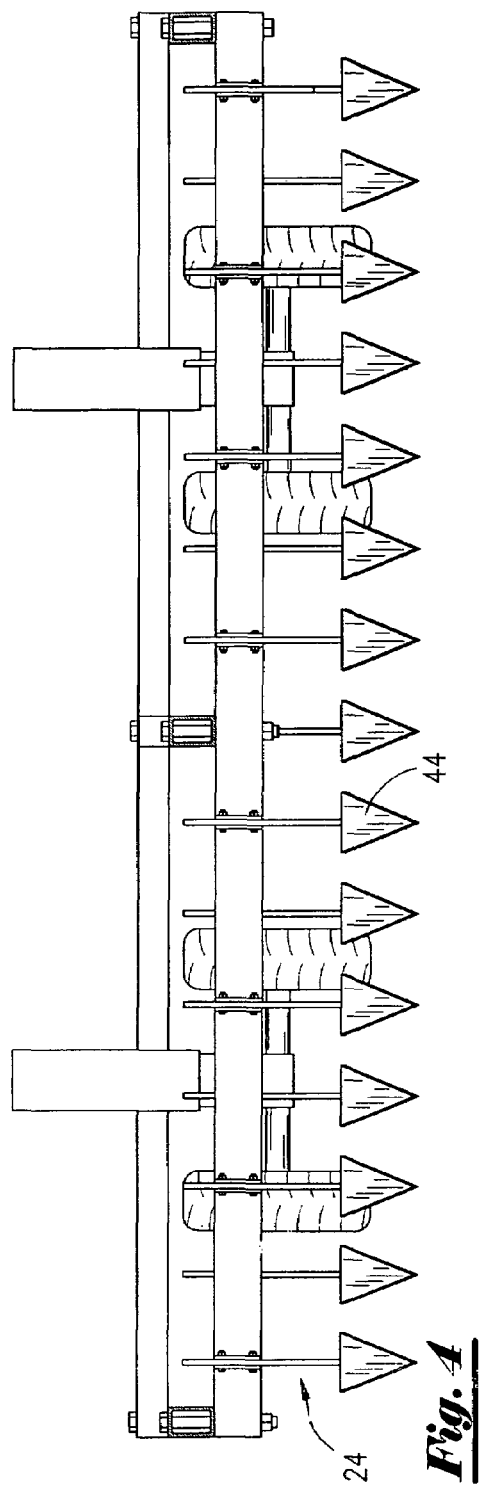

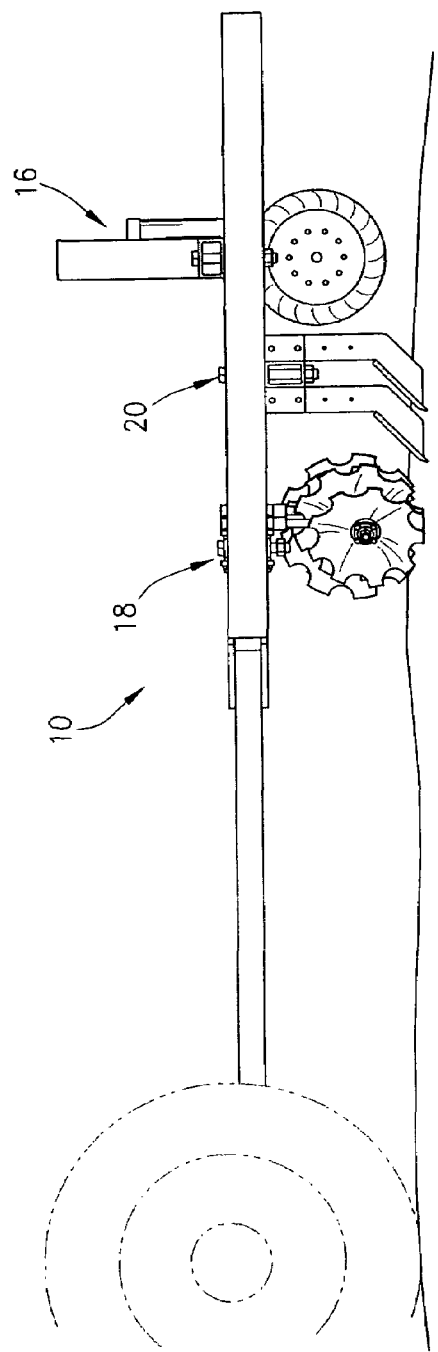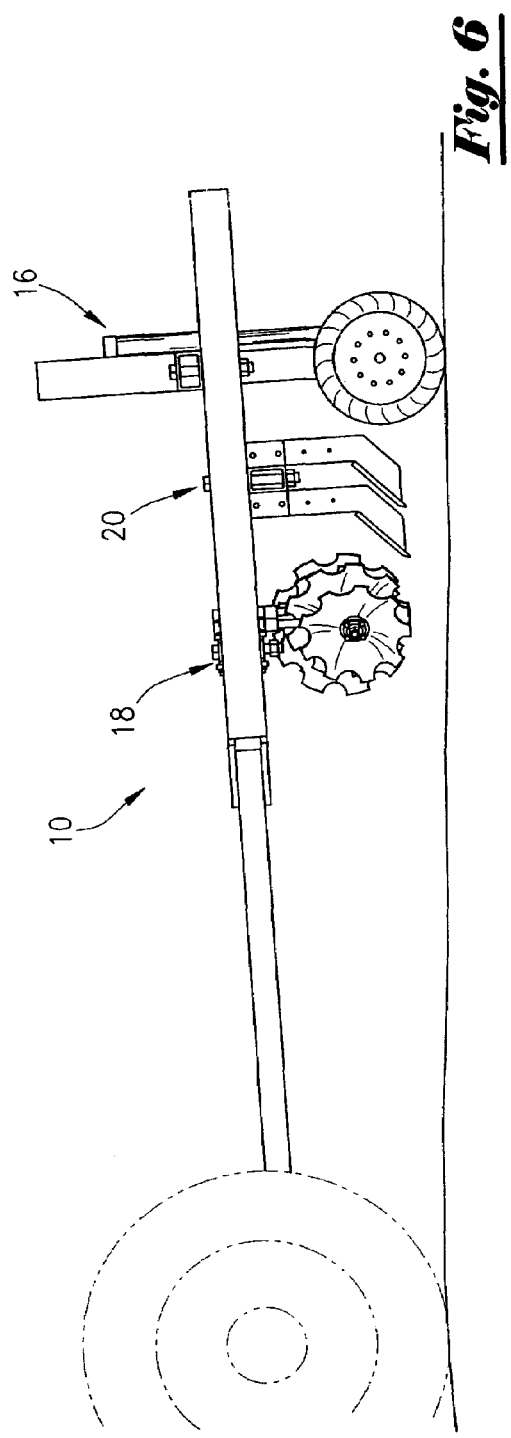
Fig. 5
Fig. 6

AGRICULTURAL DISC HARROW AND METHOD

FIELD OF THE INVENTION

This invention relates generally to a disc harrow towed by a farm tractor or the like, having retractable wheels for transport and more particularly to improvements to such disc harrows including the addition of breaker bars at strategic points and a drag-type soil leveler.

GENERAL BACKGROUND

In the preparation of soil for planting, a disc harrow, defined as a harrow equipped with a series of sharp metal discs set on edge or at an angle on one or more axles, is frequently used as an implement. Harrows have multiple gangs of discs located independently or in groups of two or more for turning and breaking the soil. These discs are generally arranged in a wide range of configurations designed to provide maximum soil disruption over as large an area as possible in a single pass. Even so, some earth remains unbroken, including large clumps or clods. In some instances picks or breaker bars are used in combination with the disc sets or as a secondary operation to insure uniform earth disruption. Disc uniformity has long been thought to be the best method of insuring uniform soil disruption. However, uniformity has proven to be elusive requiring multiple rows of disc gangs and breakers often set at oblique angles.

Furthermore, farmers find that they must often rotate their discs to compensate for wear or exchange them when damaged. However, when discs are ganged on a single diametrically and spaced and angled accordingly to prevent soil binding between the discs. Single spindle, ganged discs generally require that all discs in a particular gang be set at the same angle of attack, therefore, most harrow discs generally have some means for changing the angulations of all discs in the gang at the same time.

In cases where single disc mountings are utilized the angle of attack may be varied but conventional wisdom and the cost of providing individual, adjustable acute angulations tends to make this feature impractical. Therefore, simultaneous angulations settings remain customary even where single disc mountings are used. Since it is desirable to maintain a consistent depth of spindle, this act becomes a time consuming chore. Discs assembled in a gang are generally all the same size cut and the discs are generally set so that the disc spindles of all gangs are set for the same dimension below the tool bars or some means is provided for raising and lowering the gangs. Any disc that is not of uniform diameter does not cut the soil to the same depth. To insure a uniform depth of cut from each disc, they must be all the same diameter or have some means for individual height adjustment. Disc depth and angle adjustment coupled with disc wear has long been a costly problem for farmers due to the time required to set both the depth and angulations of each disc and or change-out worn discs. No provision has been made for recycling worn or damaged discs.

It has long been known that a gang disc assembly set at an acute angle of attack helps prevent clogging of soil between discs upon first turning the soil. Adding a second disc gang at an obtuse angle to the first gang helps chop the soil. Such arrangements allow for circular field cultivation. Whereas inline disc gangs towed or attached in a three-point hitch arrangement located perpendicular to the direction of travel are used for back and forth field cultivation, the latter arrangement inevitably leaves irregular soil patterns near each end of the disc gangs. This requires a second or third set of ganged discs to insure proper soil disruption at each end of the disc gangs. It would therefore be advantageous to provide for maximum disruption of the soil at each end of the gangs on the first pass. This is especially advantageous if this could be done without clogging between the discs.

In addition, leveling and smoothing the broken ground, rather than simply further breaking the clods, is a desirable effect and should be accomplished during disc cultivation process. Soil levelers are currently used in secondary operations rather than in combination with the disc harrow.

Current discs are designed to rotate and are often serrated to provide a chopping effect while turning the stubble, grass, etc., under, thus exposing the roots on the surface. However, in some cases it is advantageous to cut the soil without turning the topsoil under, such as where no grass or stubble exists. In such cases rotating the soil is not only unnecessary but also detrimental by exposing the vital nutrients to the elements of wind and rain. It would therefore be advantageous to simply loosen the soil.

The invention disclosed herein addresses the issues raised above with a novel, simplistic approach.

SUMMARY OF THE INVENTION

An agricultural implement consisting primarily of a drawn frame supported on retractable wheels, the frame having a plurality of independently adjustable spindles for setting height and angle of attack for various size rotatable discs. Each disc is staggered to reduce resistance. Each group of discs further includes descending diameter discs at each end with the angle of attack increasing with each decrease in diameter while spacing between the discs decreases as the diameters are reduced. The implement further includes harrow teeth or picks located at strategic points adjacent the discs to ensure uniform soil disruption. The disc assembly is convertible from single gang to double gang assembly and may include conventional harrow teeth sets and or unique soil leveler attachments.

BRIEF DESCRIPTION OF THE DRAWINGS

For a further understanding of the nature and objects of the present invention, reference should be made to the following detailed description taken in conjunction with the accompanying drawings, in which, like parts are given like reference numerals, and wherein:

FIG. 3 is a front elevation view of the first embodiment shown in FIG. 1 taken along sight line 3—3 seen in FIG. 2;

FIG. 4 is a rear elevation view of the first embodiment shown in FIG. 1 taken along sight line 4—4 seen in FIG. 2;

FIG. 5 is a partial side elevation view of the first embodiment shown in FIG. 1 showing hydraulic lift apparatus in the retracted position;

FIG. 6 is a partial side elevation view of the first embodiment shown in FIG. 1 showing hydraulic lift apparatus in the extended position;

DETAILED DESCRIPTION OF THE PREFERRED EMBODIMENT

Figure 1:
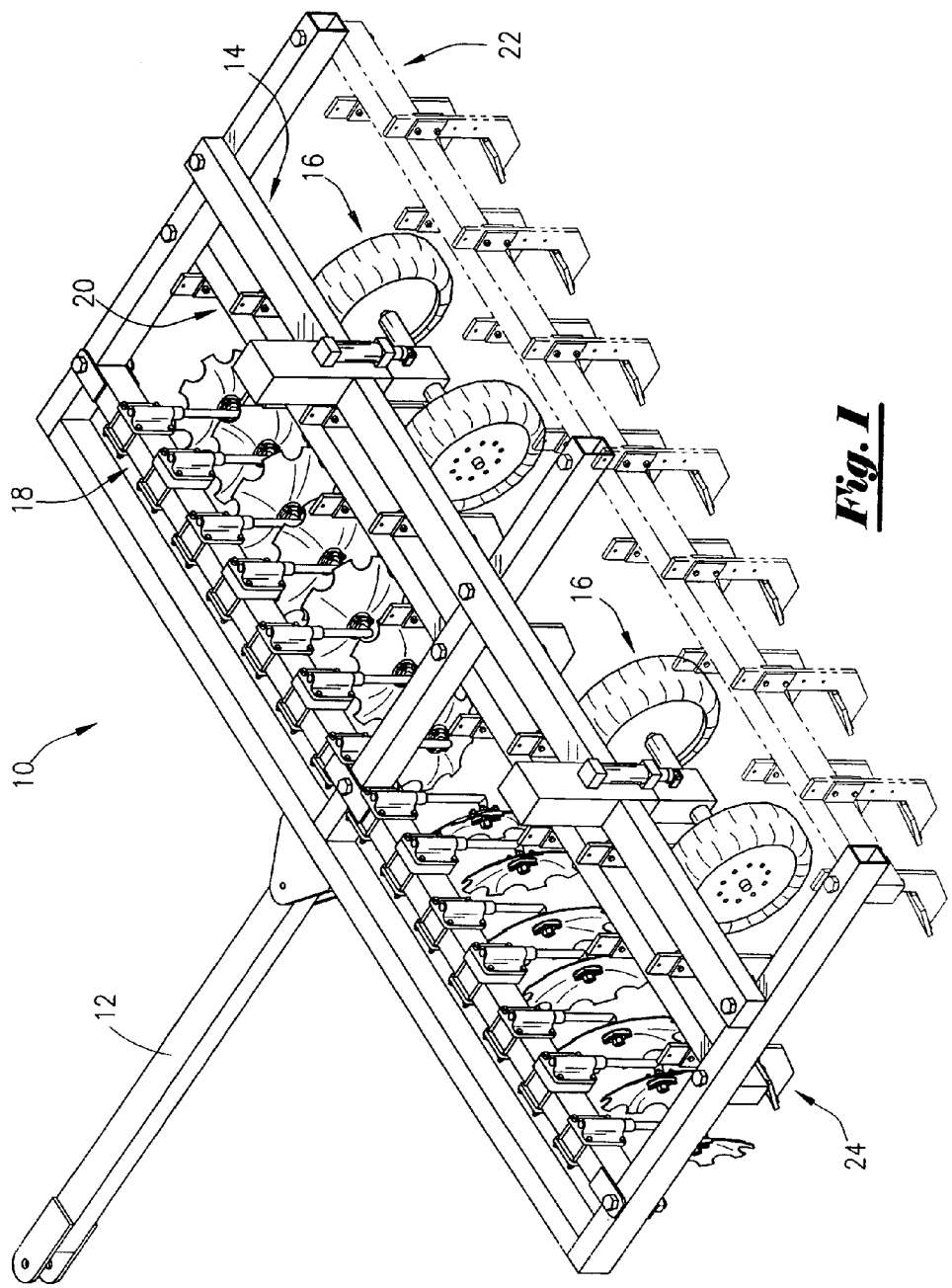
FIG. 1 is an isometric view of the first embodiment of the disc harrow combination.
Figure 2:
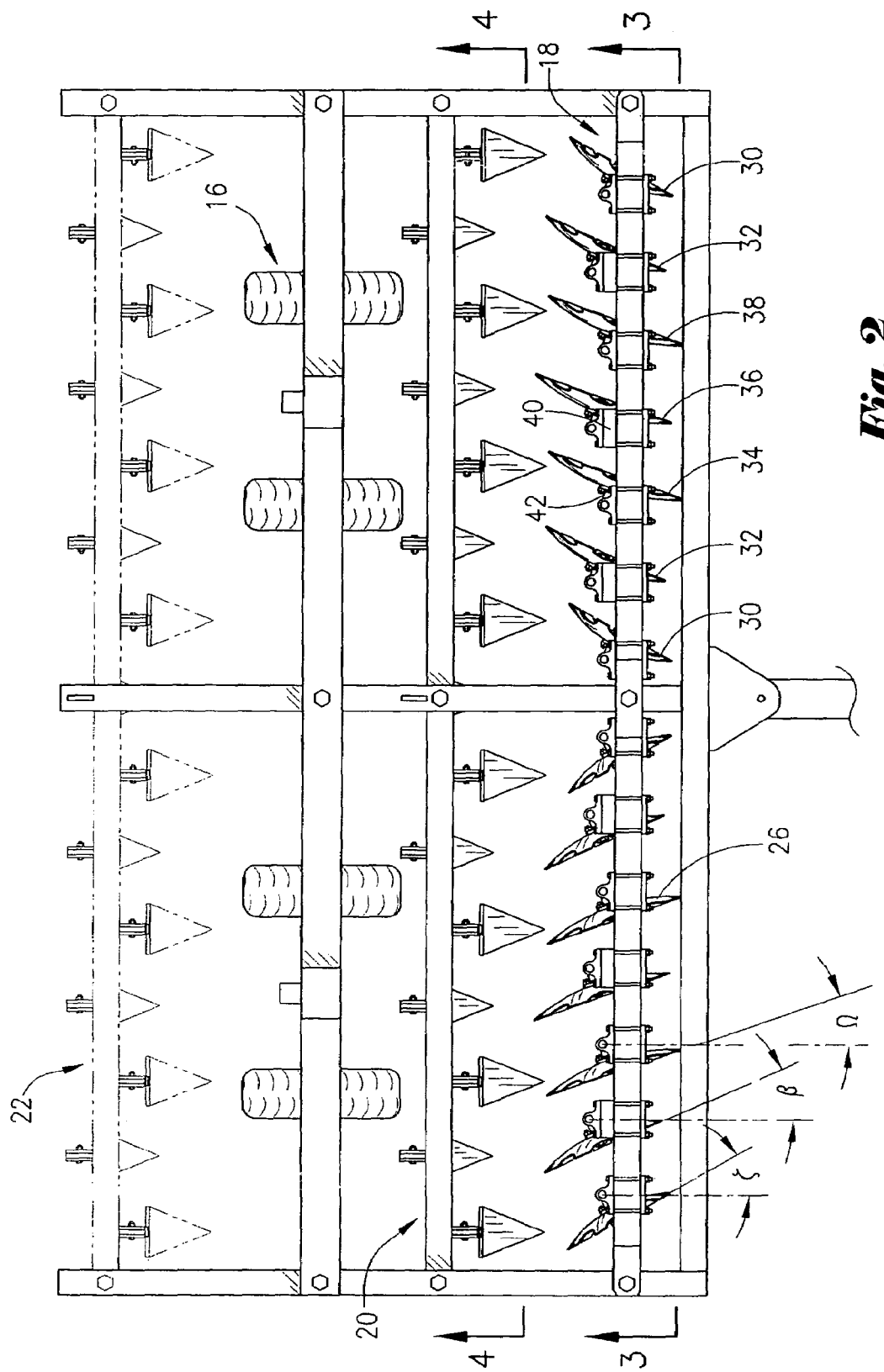
FIG. 2 is a top view of the first embodiment show in FIG. 1.

Looking at the first embodiment of the disc harrow assembly 10 shown in FIG. 1, it can be seen that the assembly is a towed implement including a pivotal tow tongue 12 and a frame assembly 14 supported by a pair of hydraulically retractable wheel assemblies 16 with the leading tool bar assembly 18 being perpendicular to the tongue 12 that includes a plurality of rotatable discs. The assembly 10 is further provided with a secondary tool bar assembly 20 located directly behind the leading tool bar 18 and in front of the wheel assemblies 16 fitted with a plurality of vertical breaker bar assemblies 24. An optional third tool bar assembly 22 may be attached to the disc harrow 10 frame assembly 14 behind the hydraulically retractable wheel assemblies 16 if desired. Turning now to FIG. 2 we see that the primary or leading tool bar assembly 18 with its plurality of rotatable discs 26 is arranged in an usual manner with one group facing one direction and the second group facing the opposite direction. However, the discs are not uniformly sized in this case. It should be noted that some disc diameters increase in size starting at each end of the groups or sets of discs 27 and 29 until an optimum size diameter is reached. For example Items 30 may be 18 inches in diameter, items 32 may be 20 inches in diameter, while the remaining intervening disc 34–38 may be 22 inches in diameter. It should also be noted that every other disc assembly is staggered by applying a spacer 40 to the mounting bracket 42. Further attention should be drawn to the increasing angulations $\xi$, $\beta$, $\eta$ of the smaller diameter discs 3 and 32 always being set greater than that of the larger diameter discs 34–38. This and the stagger allow for closer spacing of the discs without clogging. Looking now at FIG. 3 we see that although some of the discs have different diameters, they are all positioned so that their major diameters are in the same plane parallel to the tool bar assembly 18. i.e. all disc cutting edges resting on a supporting surface. Unlike the prevailing art, it is anticipated that the disc angulations are to be fixed rather than variable. Each disc assembly includes mounting bracket, a vertical leg, and a bearing assembly that allow the disc to rotate typical in the art. Each assembly is independent; therefore, each disc may be changed at will without the need for removing or otherwise disturbing the adjacent discs.

As seen in FIG. 4 the vertical breaker bar assemblies 24 may be simply a cutting bar or may be fitted with triangular plow points 44 and be spaced directly between the center disc 30 and at each side of the outermost disc or evenly spaced as shown to insure even breaking of the soil behind the discs. In either case, the breaker bar assemblies 24 insure maximum disturbance of the soil. Adding the optional tool bar assembly 22, as seen in FIG. 1, and its breaker bar assemblies helps break the soil into smaller sizes.

The disc harrow assembly 10, being fitted with hydraulic lifting wheel assemblies 16 for towing as shown in FIG. 6, may be lowered to set the cutting depth or fully retracted as shown in FIG. 5 in a manner generally known within the art.

Figure 7:
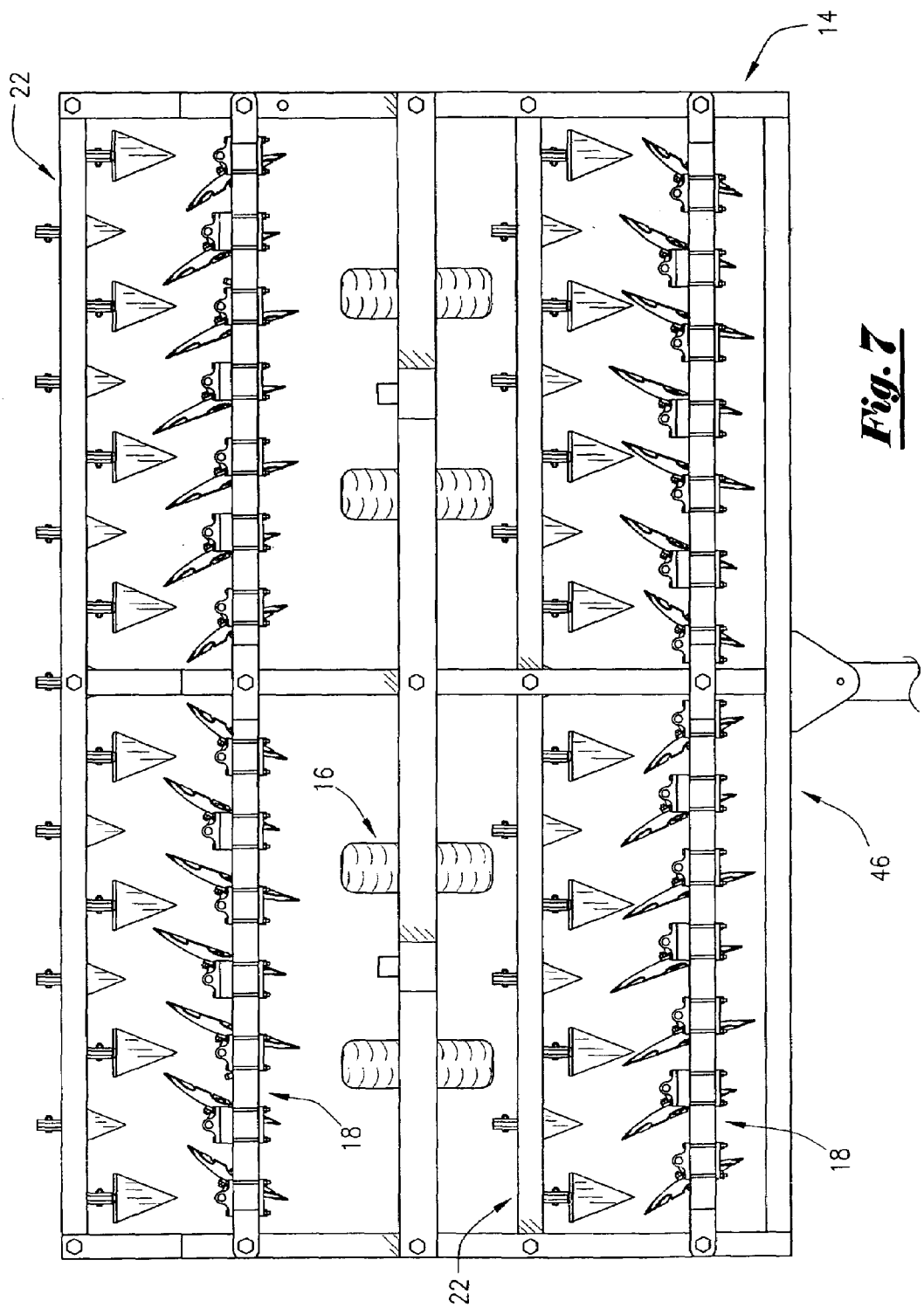
FIG. 7 is top view of a second embodiment of the disc harrow combination.

Looking now at FIG. 7 we see a second embodiment 46 in which an optional $2^{nd}$ and tool bar 18, including its disc assemblies and a second breaker tool bar 22, may be attached to the disc harrow frame assembly 14 aft of the wheel assemblies 16 in place of the breaker tool bar 20 as seen in FIGS. 5&6. Additional breaker bars may be added to the breaker tool bar assembly 20, thus making it equivalent to the third tool bar 22 discussed above.

Figure 8:
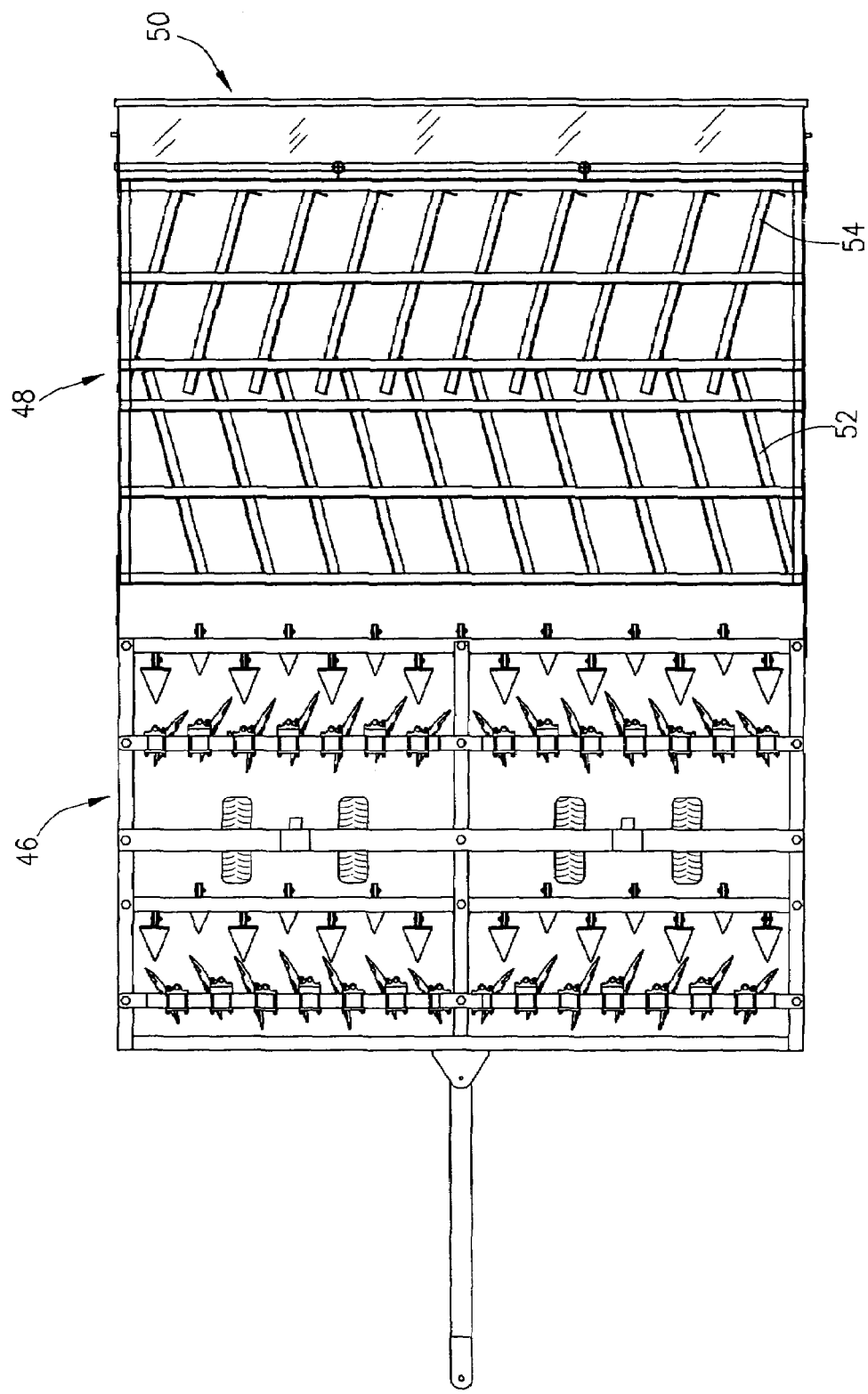
FIG. 8 is a top view of the second embodiment shown in FIG. 1 with optional leveler and smoothing blade.
Figure 9:
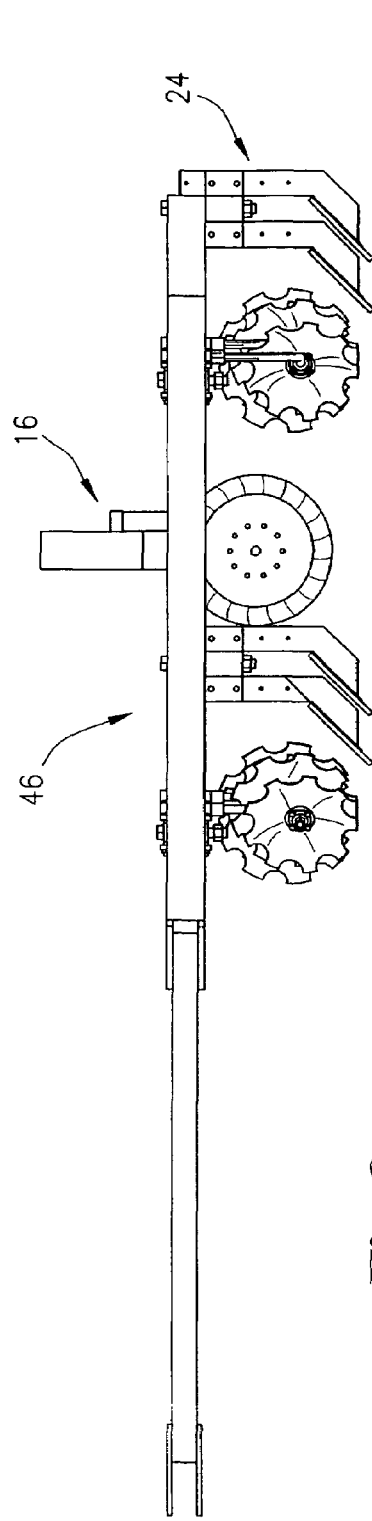
FIG. 9 is a partial side elevation of the second embodiment shown in FIG. 7.

FIG. 8 shows yet another option that may be added to the improved disc harrow assembly 46 shown in FIG. 8. In this case a leveler assembly 48 and a smoothing plate assembly 50 are attached. Elements of the second embodiment 46 may be seen in the side elevation view shown in FIG. 9 showing the stagger of the vertical breaker bar assemblies 24.

Figure 10:
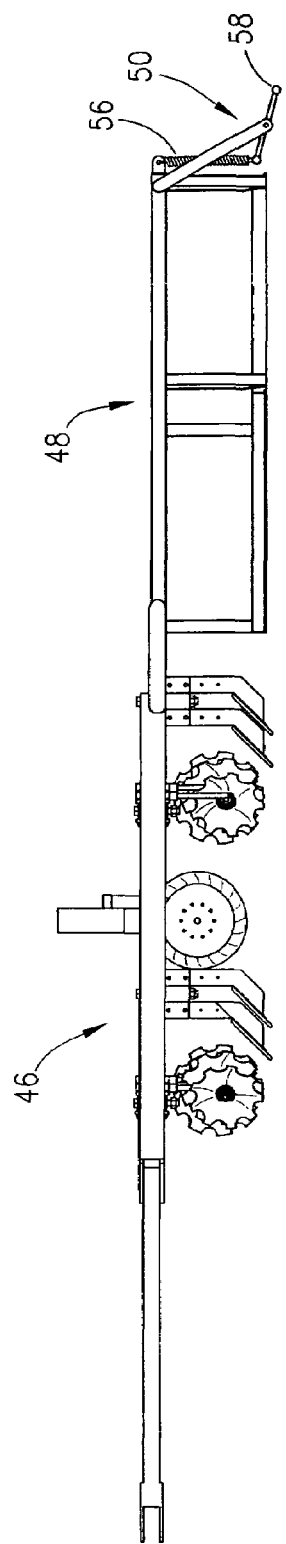
FIG. 10 is a side elevation of the second embodiment shown in FIG. 8.
Figure 12:
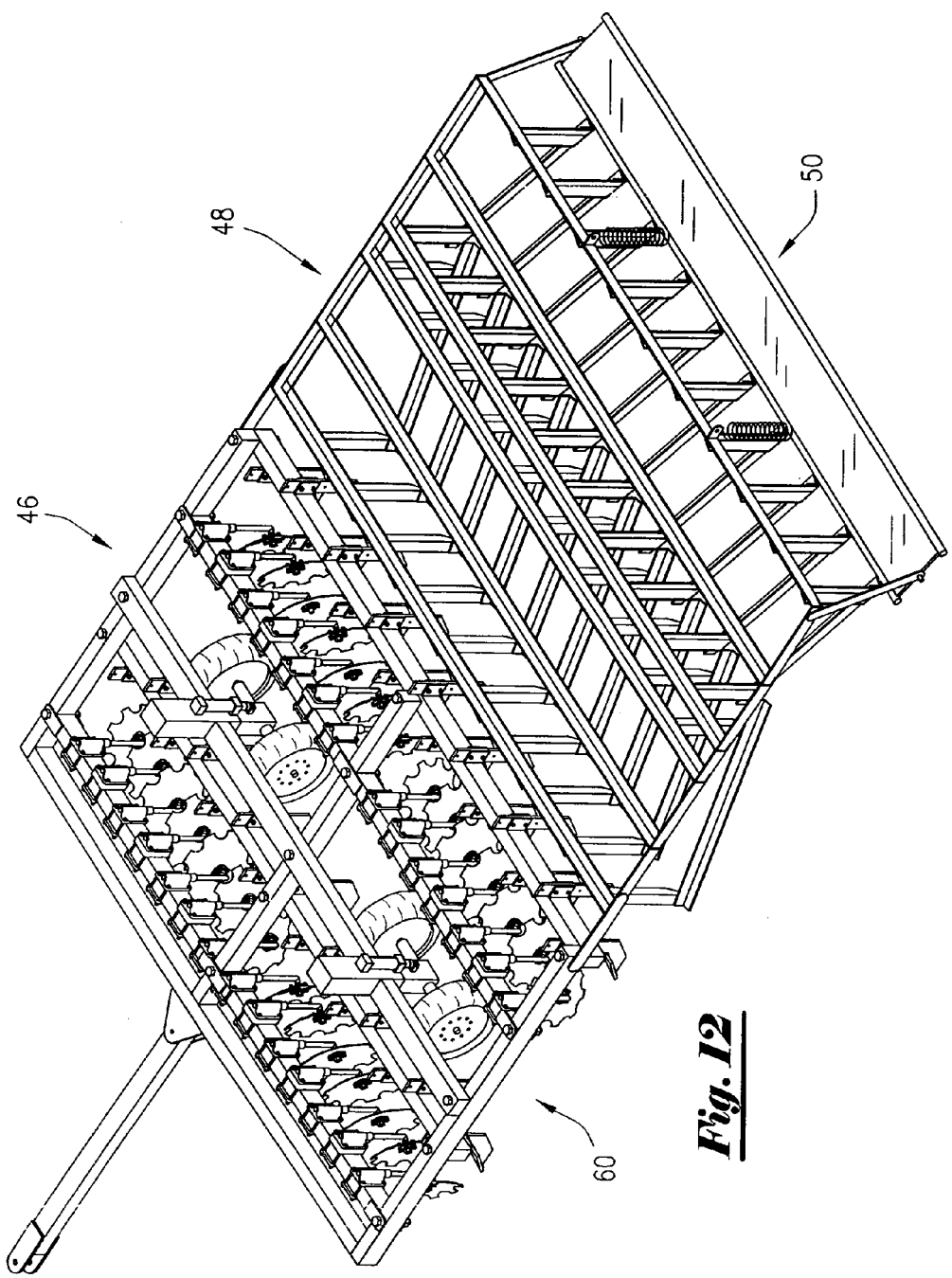
FIG. 12 is an isometric view of the second embodiment shown in FIG. 8.

As may be seen in FIG. 8, FIG. 10, and in the isometric view of FIG. 12 the leveler 48 utilizes a plurality of right angle shaped bars 52,54 set at acute angles forming a herringbone pattern. Soil is passed along the lower leg of the angle bars 52 in one direction and transferred to the lower leg of the angle bar 54 leading in another direction before being passed under the smoothing plate assembly 50. As seen in FIG. 10 springs or other tension systems 56 may be used to maintain tension on the smoothing plate 58.

Figure 11:
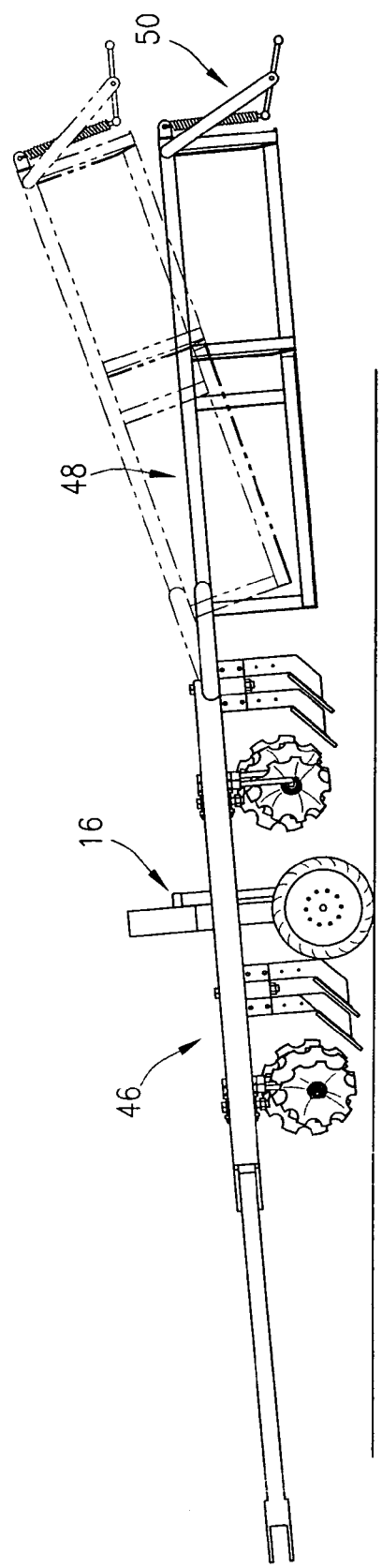
FIG. 11 is a side elevation of the second embodiment shown in FIG. 8 with hydraulic lift in the extended position.

In any case, the leveler assembly 48 and the smoothing plate assembly so are mounted to the second embodiment in such a manner the leveler assembly 48 and the smoothing plate assembly 50 are flexible relative to the disc harrow assembly 46 but remain in a sufficiently ridged connection so as to allow the leveler and smoother plate assemblies 48, 50 to be lifted by the wheel assemblies 16 as shown in FIG. 11.

Figure 13:
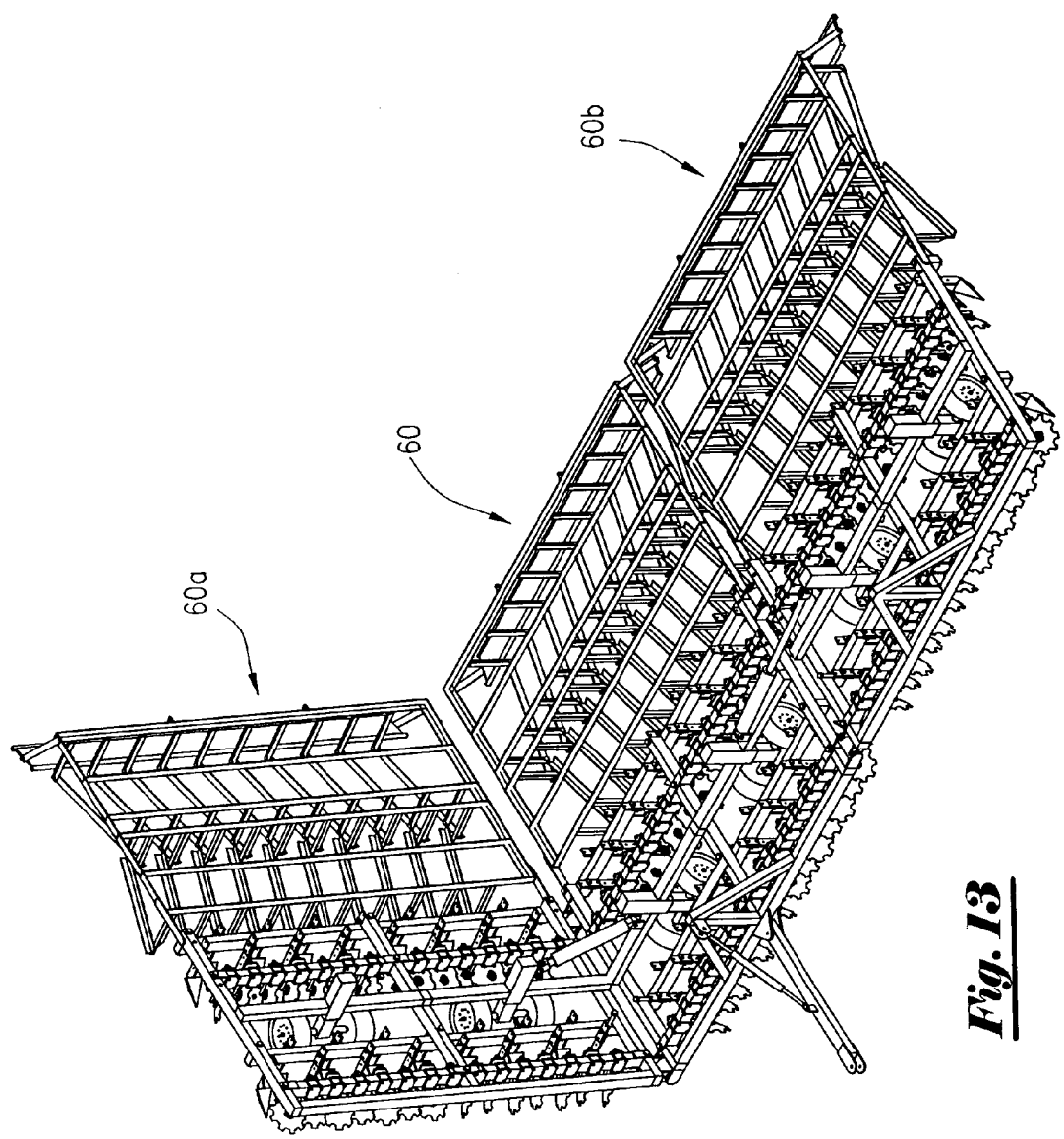
FIG. 13 is an isometric view of the second embodiment shown in FIG. 8 with duplicate wing disc harrow combination sections pivotally attached at each side.

The combination assembly 60 as depicted in FIG. 12a may be duplicated and hinged to each side of the assembly 60 as shown in FIG. 13. The wing assemblies 60a and 60b may be hydraulically lifted for transport in the typical manner currently employed by the art.

Figure 14:
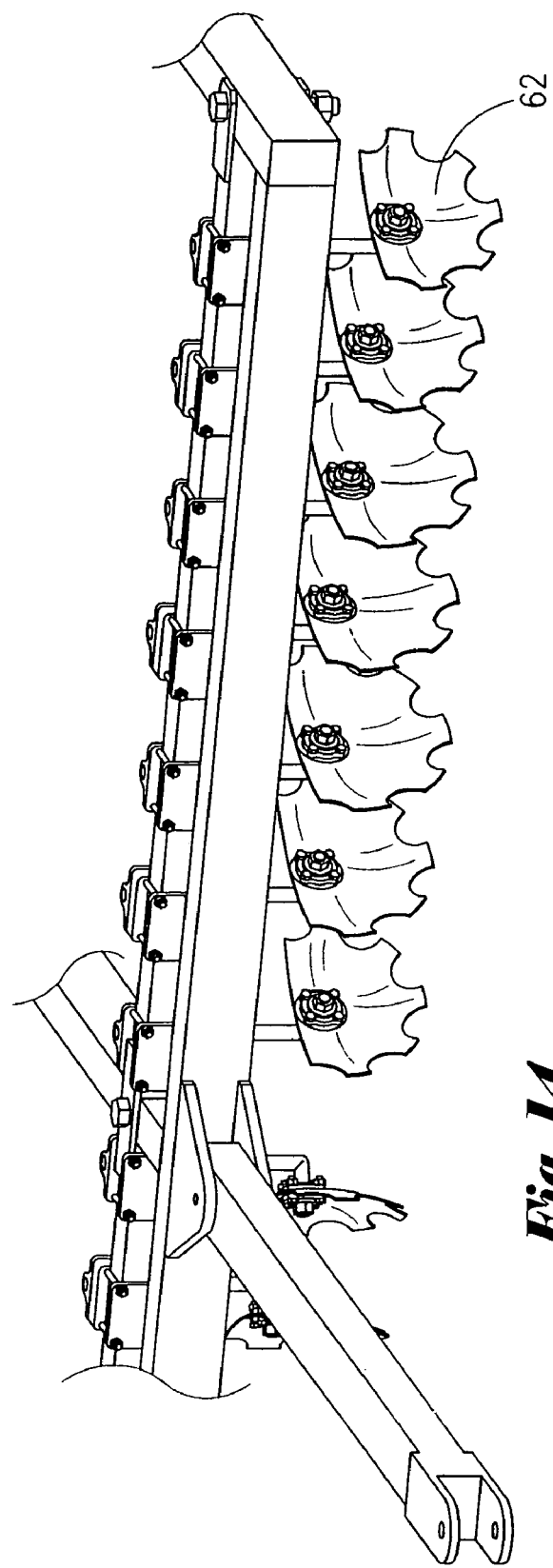
FIG. 14 is a partial isometric view of the first or second embodiments utilizing non-rotating half discs.

Looking now at FIG. 14 we see another innovation in that the leading disc assembly 18 may be replaced with non-rotatable half discs made from reconditioned broken or worn discs. It has been found that the disc harrow assemblies 10 or 46 are capable of utilizing these half discs 62 to cut the soil in some cases prior to breaking with the breaker bars assemblies 24, either with or without the leveler or smoother plate assemblies 48, 50.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in any limiting sense.

What is claimed is:

1. A disc harrow comprising:
  a) a rectangular frame;
  b) a plurality of tool bars attached to said frame;
  c) a plurality of rotatable discs attached to at least one of said tool bars in a manner wherein each of said rotatable discs is independently vertically mounted to one of said tool bars in a staggered non-pivotal manner and wherein the angulations of each said rotatable discs are fixed and not uniformly spaced relative to each other;
  d) a plurality of vertical breaker bars attached to at least one of said tool bars located aft of said discs in a manner whereby one of said breaker bars is located directly behind each of said disc;

e) a plurality of hydraulically retractable wheels attached to at least one of said tool bars; and f) a towing means attached to said frame.

2. The disc harrow according to claim 1 wherein said plurality of discs are arranged in a row perpendicular to said towing means said disc having at least two groups arranged with adjacent groups facing outwardly in opposite directions from the center of said frame, each said group having a plurality of descending diameter discs at each end of each group, the major diameter of each disc being located on a horizontal plane.

3. The disc harrow according to claim 2 wherein said descending diameter discs have escalating angulations and decreasing spacing between said descending diameter discs.

4. The disc harrow according to claim 1 wherein said discs further comprise a mounting bracket, a vertical leg, and a rotating means.

5. The disc harrow according to claim 4 wherein said stagger is achieved by adding a spacer to said mounting bracket.

6. The disc harrow according to claim 1 wherein at least a portion of said rotatable discs are replaced with fixed non-rotatable half disc having a radius of about half the diameter of said rotatable disc.

7. The disc harrow according to claim 1 wherein said plurality of vertical breaker bars is staggered.

8. The disc harrow according to claim 7 wherein said breaker bars further comprise plow points.

9. The disc harrow according to claim 1 wherein said disc harrow further comprises an earth leveler attached to said frame.

10. The disc harrow according to claim 9 wherein said earth leveler comprises:

a) a vertically pivoting frame; and b) a plurality of right angle-shaped bars located parallel to and supported by said vertically pivoting frame arranged at acute angles in a herringbone pattern.

11. The disc harrow according to claim 10 wherein said earth leveler comprises a-smoothing plate attached to said frame.

12. The disc harrow according to claim 11 wherein said smoothing plate further comprises:

a) a support frame located aft of and attachable to said disc harrow;

b) a pivotal biased plate having one edge in contact with soil being disturbed by said disc harrow extending longitudinally across said rectangular frame.

13. The disc harrow according to claim 1 wherein said disc harrow comprises duplicate disc harrows attached adjacent to each side of said disc harrow.

14. The disc harrow according to claim 13 wherein said duplicated disc harrows are hydraulically pivotal for transport.

15. A towed disc harrow having a towing direction, retractable wheels and utilizing a rectangular horizontal frame having at least one tool bar attached thereto to which a plurality of independently mounted disc assemblies are attached in a row located perpendicular to said towing direction and at least one tool bar having a plurality of vertical breaker bars attached thereto located aft of said independently mounted disc assemblies, the disc assemblies centrally divided into two groups with one group having a fixed angled in one direction and the second group fixed at the opposite angle the disc harrow further comprising a means for fixedly offsetting every other disc assembly thereby staggering the row of discs, each group of discs further comprising a plurality of descending major diameter discs located at each end of each group with angulations becoming greater as disc's major diameters decrease while the spacing between the discs becomes smaller.

16. The disc harrow according to claim 15 further comprising a tool bar having staggered vertical breaker bars.

17. The disc harrow according to claim 16 further comprising a leveler having a plurality of right angle bars arranged at acute angles to each other in a herringbone pattern.

18. The disc harrow according to claim 17 further comprising a biased smoothing plate.

19. The disc harrow according to claim 15 further comprising non-rotating discs.

20. The disc harrow according to claim 15 wherein said major diameters of each said disc are aligned on a horizontal plane.

* * * * *